Nov. 20, 1923.
J. A. FINCKE
1,474,817
METHOD OF MAKING WALL COVERINGS IN IMITATION OF NATURAL STONE
Filed Dec. 3, 1920
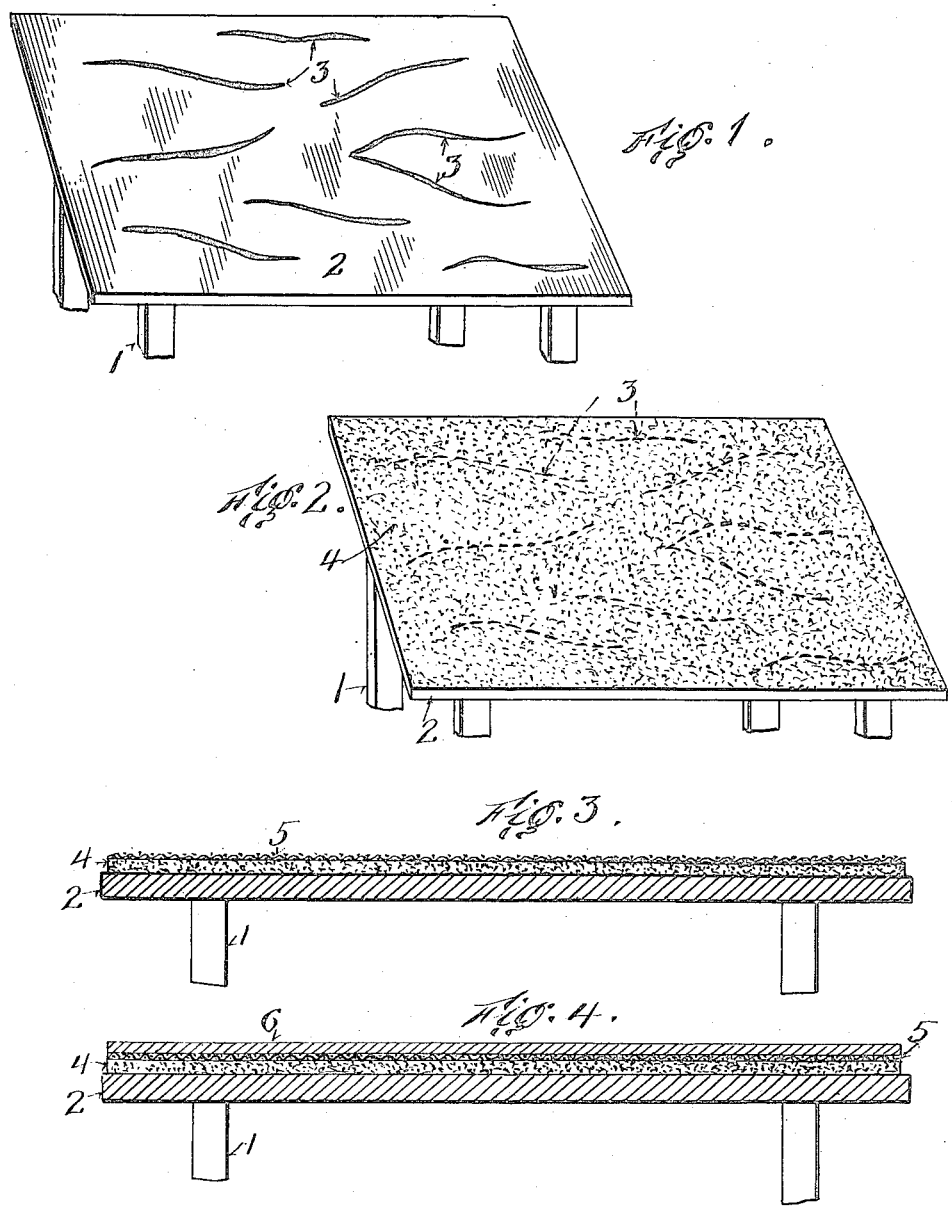

Patented Nov. 20, 1923.

1,474,817

UNITED STATES PATENT OFFICE.

JOHN A. FINCKE, OF NEW YORK, N. Y.

METHOD OF MAKING WALL COVERINGS IN IMITATION OF NATURAL STONE.

Application filed December 3, 1920. Serial No. 427,946.

*To all whom it may concern:*

Be it known that I, JOHN A. FINCKE, a citizen of the United States, and a resident of the city, county, and State of New York, have invented certain new and useful Improvements in the Methods of Making Wall Coverings in Imitation of Natural Stone, of which the following is a specification.

My invention relates to a method of making wall coverings and the like in imitation of natural stone. It is common practice to make wall coverings in imitation of natural stone such as French millstone, marble, etc., by preparing a body material partly of plaster or cement in a liquid state which is placed on a slab or table to set. The veins or natural stone markings have been imitated by dipping strands of silk in liquid paint or pigment and these strands were placed on the table and over them was placed the liquid body material to set in a sheet or slab. When the body material was partially set the silk threads were pulled out of the surface of the body material leaving some of the coloring matter which they contained, remaining in the slab or sheet to represent the veins or natural markings of stone. One disadvantage of this method is that it is a slow method and the other is that the product is rather a crude representation of the natural stone.

The object of my present invention is to provide a method which will not only be much faster in operation, thereby reducing the cost of manufacture, but by means of my invention more perfect imitations of natural stones may be made. Very realistic imitations of natural veins may be obtained and almost any desired effect is within the reach of even an unexperienced operator.

In the drawing forming part of this application:

Figure 1 is a view showing the table on which the slab is to be made, with the first or dry coloring material for vein markings placed thereon, Figure 2 shows the same after the coat of body material has been placed on the dry material, Figure 3 is a sectional view which shows the same after the fabric has been applied.

Figure 4 is a sectional view showing the wet coat of body material applied.

I prefer to use the same ingredients for the body material as are commonly used in the present day methods and to use the same coloring or pigments as are used in present methods, and these are well known to those skilled in the art, as well as the manner of mixing and proportioning them.

In carrying out my improved method I prefer to proceed in the following manner:

Some support or base is employed on which to form the slab and for this purpose I prefer to use a table 1 having a top 2 of suitable material such as marble. I first prepare a dry mixture composed of the same ingredients (only dry) as are generally used for body materials in the old processes. This may consist of keen cement or plaster or Portland cement mixed with crushed aggregates or marble dust, according to the effect to be produced. If the slab is to be used for interior purposes keen cement or plaster together with crushed aggregates or marble dust may be used, whereas, if the slab is to be used for exterior purposes I prefer to use Portland cement in place of the keen cement or plaster.

With a portion of this mixture I mix (dry) the desired pigment, which may be dry mineral coloring (water soluble), such as has commonly been used in former methods. This mixture of body material and pigment, indicated at 3, is placed on the top surface of the table in lines or other formation to represent veins or natural stone markings, the same covering only portions of the surface of the table. This mixture is placed on the table in the dry state. The remainder of the table surface not covered by the coat 3 is covered with the plain dry body material which has been mixed without the pigment and which I have indicated as 4. I prefer to build up the first coat to an appreciable depth with the uncolored body material partly overlying the colored portion or material 3.

Thus far all materials have been placed on the table in the dry state.

The next step is to place on the dry body the fibrous material used for reinforcement to give the desired strength to the slab to permit it to be handled without breaking. For this purpose I prefer to place a piece of netting or burlap 5 upon the dry materials 3, 4 which now cover the table.

Upon the piece of fabric 5 I place a coating of wet body material 6 composed of the cement, or plaster, or Portland cement, and crushed aggregate or marble dust, and this wet coat may be of sufficient depth to form a slab of the required thickness for the particular purpose for which it is to be used.

The whole is then allowed to set and dry until it is in condition to be bodily removed as a complete slab from the table.

When the wet top coat of body material is applied in the manner above described some of the moisture therefrom will be caused by capillary action to pass through the fabric 5 and through the interstices thereof into the dry materials 3, 4 lying below it. This moisture will be sufficient to cause the dry materials to become sufficiently wet so that it will slack and become hard like the top coat. I have found that sufficient moisture may be thus imparted to the dry materials so that when the whole slab has set and hardened it will be as durable or even more so, than in the old methods.

The moisture which passes from the top coat to the lower coat not only wets the dry body material but also the pigment or coloring matter which is mixed with part of the body material and when the body material sets or hardens the pigment or coloring matter will be permanently incorporated and held therein so that subsequent wetting of the slab will not affect the coloring. The coloring material is thus dissolved and also set in the body material. By following this method it is possible to reproduce very accurately the vein effects or markings of natural stones.

The method may be performed in much less time than can former methods and it is not necessary to carefully observe the setting action of the slab and to withdraw the coloring silk at the required time as in the former method described above.

While I have described above the first step of the method as consisting of applying the coloring material mixed with some of the dry body material it will be apparent that as a modification of this step, where sharp color demarkations are desired, plain dry coloring material may be distributed over portions of the table and then dry body material may be placed over this and the uncovered portions of the table and from then on the steps may be performed as above described.

It will be understood that when the slab is put into use the surface which was in contact with the table will constitute the decorative surface which is exposed to view when the slab is in place. The finished slab may be applied to a wall in the same manner as the slabs made under former methods.

Stone is here used in a broad sense to mean not only the materials commonly called stone but also granite, marble and onyx.

Having described my invention, what I claim is:

The method of making slabs or wall coverings in imitation of natural stone which consists of mixing together body material and coloring matter in a dry state and applying the mixture in a dry state to portions of a supporting surface to represent natural stone markings, applying uncolored, dry body material to other portions of the supporting surface, placing on said dry materials a fabric binder, and placing on said binder a layer of wet body material whereby the moisture from the wet body material will permeate the dry materials and cause the whole to form an integral mass or slab, allowing the mass to set and removing it from said support.

Signed at the city, county and State of New York this 29th day of October, 1920.

JOHN A. FINCKE.